United States Patent [19]

Kuppinger

[11] Patent Number: 5,061,125
[45] Date of Patent: Oct. 29, 1991

[54] BORING DEVICE

[75] Inventor: Eugen Kuppinger, Hochdorf, Fed. Rep. of Germany

[73] Assignee: Cross Europa-Werk, GmbH, Wendlingen, Fed. Rep. of Germany

[21] Appl. No.: 559,819

[22] Filed: Jul. 30, 1990

[30] Foreign Application Priority Data

Aug. 23, 1989 [DE] Fed. Rep. of Germany ... 8910085[U]

[51] Int. Cl.⁵ .............................................. B23B 47/00
[52] U.S. Cl. .................................. 408/150; 279/175; 409/233; 408/240; 82/1.2
[58] Field of Search ............... 279/6, 51, 1 W, 1 E, 279/1 ME, 1 TS; 408/162, 158, 239 A, 240, 151, 150; 409/231, 233; 82/1, 4; 51/43

[56] References Cited

U.S. PATENT DOCUMENTS

| | | | |
|---|---|---|---|
| 3,105,413 | 10/1963 | Lanzenberger | 51/43 |
| 3,613,192 | 10/1971 | Tanabe et al. | 408/158 X |
| 3,700,345 | 10/1972 | Schubert | 408/150 |
| 3,731,562 | 5/1973 | Heuser | 408/150 X |
| 3,884,590 | 5/1975 | Shrentner et al. | 408/150 X |
| 4,154,555 | 5/1979 | Skrentner | 408/158 X |
| 4,602,539 | 7/1986 | Tsukiji | 82/1.2 |
| 4,704,056 | 11/1987 | Babel | 408/240 X |
| 4,773,799 | 9/1988 | Guironnet | 408/150 |

Primary Examiner—Gary F. Paumen
Assistant Examiner—Robert Schultz
Attorney, Agent, or Firm—John R. Benefiel; Raymond J. Eifler

[57] ABSTRACT

A boring device adapted to mount boring tools for automatic tool changing, in which an eccentric mounting of relatively rotatable inner spindle 11 and main spindle (2) allows radial adjustment of the tool. Relative rotation of inner and outer spindles is accomplished by axial driving of a threaded bolt (22) by an actuator motor (67), causing rotation of a nut (19) fixed to the inner spindle (11). Continued overtravel of the threaded bolt (22) past an adjustment range (47) and safety range (51) causes releasing operation of a spring biased pull rod (36) which releases a tool clamping mechanism (14) to allow automatic tool changing.

8 Claims, 3 Drawing Sheets

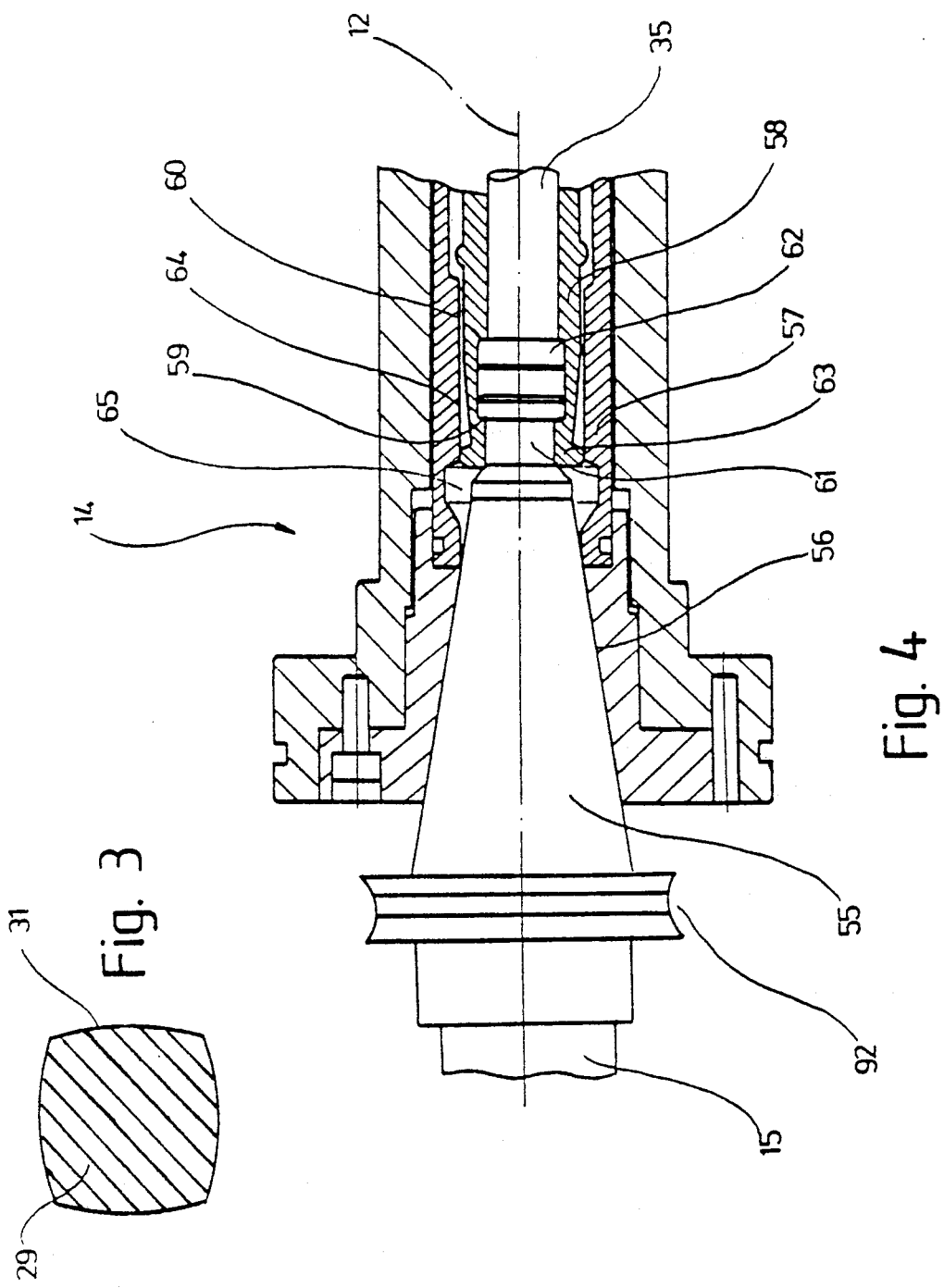

BORING DEVICE

This invention relates to boring accessory devices for machine tools in which a radial adjustment of mounted boring tools is made possible.

An eccentric headstock is known from DE-AS (German published patent application) 2 055 391. In the known boring device, the tool spindle contains a bore which is eccentric in relation to the axis of rotation of the tool spindle and in which an internal spindle is rotatably but axially immovably mounted. The internal spindle carries a tool receiving means on its head protruding from the tool spindle. At the other end of the internal spindle, a screw drive is provided in the tool spindle for rotating the internal spindle relative to the tool spindle. The threaded nut of the screw drive is rotationally fixedly connected to the internal spindle.

The screw drive comprises a threaded bolt which is nonrotatably but axially displacably mounted in the tool spindle. The threaded bolt is coupled via an axial bearing with a tailstock sleeve which is mounted in a stationary tailstock sleeve housing in a longitudinally displaceable but non-rotatable manner. The stroke motion of the tailstock sleeve is converted via the screw drive into the advancing motion of the respective tool cutter.

Two stops are provided for fixing the axial position of the tailstock sleeve. The tailstock sleeve can be moved rapidly between these by a hydraulic thrust piston motor so it finally rests against one of the two stops. At least one of the two stops is designed an an adjustable stepped disc.

This assembly serves to adjust the radial spacing from the axis of rotation of the tool spindle for the tool held in the tool receiving means. The exact radial position is defined by the stepped disc which is adjusted for this purpose via a step drive. The maximum stroke of the tailstock sleeve is of such size that it rotates the internal spindle through 180 degrees with respect to the tool spindle and hence corresponds to the maximum possible advancing range of the tool.

In the known boring device, the tools are changed by hand. There is no provision for automatic tool change.

From DD-PS (East German Patent) 65 346 it is known to actuate the tailstock sleeve of such boring devices via a further screw drive. For this purpose, the known actuating drive comprises a driving motor, which is coupled via a Maltese cross transmission with the screw drive, enable stepwise advance of the tailstock sleeve.

The object of the invention is to provide such an eccentric headstock boring device which allows automatic tool changing with a low cost structure.

The object is accomplished in accordance with the invention by a boring device having an actuating mechanism for clamping and coupling a tool receiving to the internal spindle, means whereby the actuating mechanism is operated by axial advance of the threaded bolt past the eccentric adjustment range of movement of the threaded bolt and into thrusting engagement with a spring biased member such as a pull rod.

To prevent unintentional opening of the clamping means at the end of the adjustment range, it is expedient to separate the tool release stroke from the adjustment range by an intervening safety range of motion of the threaded bolt.

An eccentric headstock with a screw drive may be provided as an advancing device, and the advancing motion exhibits a periodicity with respect to the axial displacement of the coupling means from the advancing device in the over stroke. A particularly simple design results from the threaded nut of the screw drive being connected to the internal spindle and the threaded bolt of the screw drive being part of the coupling means.

Since the actuating means automatically holds the clamping means closed, then the coupling means only has to bring about opening of the clamping means to enable tool exchange. The drawing-in of the tool takes place automatically once the coupling means moves back. The structural design of the tool receiving means is made particularly simple by the actuating means comprising a pull rod which is pretensioned by a set of Belleville washers such that the clamping means are closed when the coupling means are not in the release stroke, i.e., have not displaced the pull rod.

The release stroke of the coupling means is transferrable in a particularly problem-free manner to the pull rod by the pull rod comprising a thrust member which is mounted with an axial bearing, in particular a thrust bearing, on the pull rod. The thrust bearing makes it possible, in spite of the axial force absorption in the release stroke, for the necessary relative rotation between the pull rod and the coupling means to take place without great additonal force expenditure.

The actuating drive may comprise a screw drive via which the driving source brings about displacement of the coupling means, enabling a particularly fine axial adjustment of the coupling means. The actuating drive can be coupled with the advancing device in a particularly simple manner by the coupling means being comprised of a tailstock sleeve consisting of two sections. The first section of the tailstock sleeve follows the rotary motion of the tool spindle, while the second section of the tailstock sleeve is connected to the first section via an axial bearing and transfers the stroke motion of the screw drive onto the first section of the tailstock sleeve. The rotationally fixed mounting of the tailstock sleeve is achieved in a particularly advantageous manner by the tailstock sleeve having a polygonal profile.

Indicating means are provided in the actuating drive, in particular limit switches which indicate the respective, position of the coupling means, and unintentional overrun of the end positions can then be prevented by a safety circuit. This offers additional protection against mechanical destruction, for example, of the screw drives, or against unintentional release of the clamping means.

DESCRIPTION OF THE DRAWINGS

FIG. 3 depicts the tailstock sleeve from the actuating drive according to FIG. 2, in cross-section.

FIG. 4 depicts the tool receiving means for the eccentric headstock according to FIG. 1, likewise in axial section.

DETAILED DESCRIPTION

Figure 1:
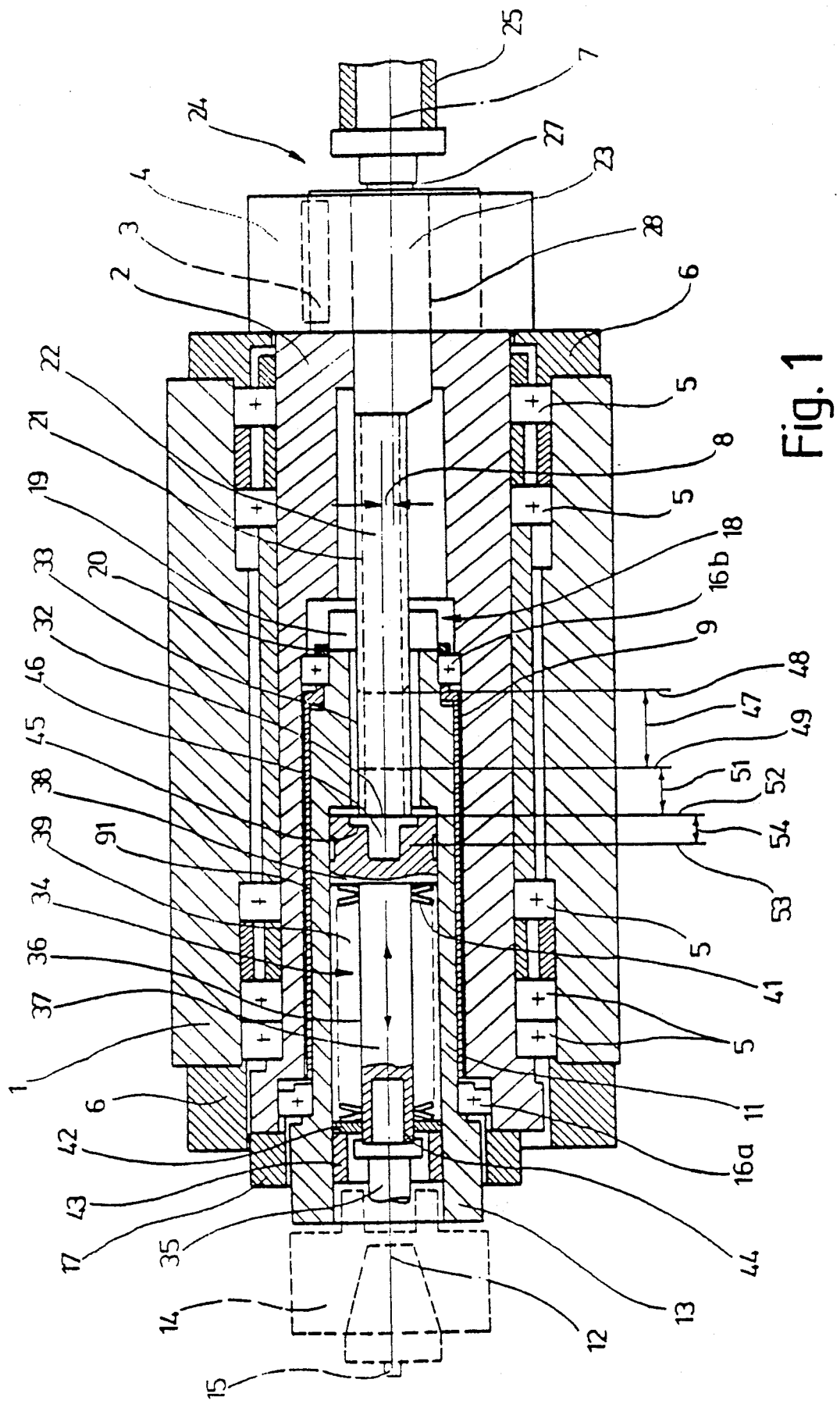
FIG. 1 depicts a fragmentary view of an eccentric headstock according to the invention designed for automatic tool exchange, in partial axial section, with the tool receiving means indicated therein and without the actuating drive.

FIG. 1 shows a tool spindle 2 mounted for rotation in a housing The tool spindle 2 carries at its rear end a belt pulley 4 which is rotationally fixedly connected to it by a key 3 and via which it is driven in a manner not described in further detail. The tool spindle 2 is mounted in a manner known in general in the housing 1 via a total of five roller bearings 5. Two rings 6 connected to the housing 1 by screws, not illustrated, are provided to axially secure the tool spindle 2 in the housing 1.

The tool spindle 2 comprises a stepped bore 9 which is arranged eccentrically in relation to its axis of rotation indicated at 7 by an extent 8, but axially parallel. An internal spindle 11, the axis of which is indicated at 12, is mounted for rotation in the stepped bore 9. The internal spindle 11 carried at its head 13 protruding from the tool spindle 2 a tool receiving means 14, indicated schematically in FIG. 1, in which a tool 15 is secured. The internal spindle 11 is mounted in the tool spindle 2 via two roller bearings 16a, 16b, at the front and rear ends of the internal spindle 11. In the axial direction, the internal spindle 11 is held immovably in relation to the tool spindle 2 by a ring 17 and a screw ring 20 screwed onto the rear end of the internal spindle 11 remote from the head 13. The ring 17 is screwed to the tool spindle 2 by screws uniformly distributed on its circumference. For reasons of clarity, the screws are lot illustrated in FIG. 1.

The internal spindle 11 is rotatable relative to the tool spindle 2 by a gearing in the form of a screw drive 18. The screw drive 18 consists of a threaded nut 19 which is rotationally fixedly screwed to the rear end of the internal spindle 11 and which is in engagement with a threaded bolt 22 which carried a non-self-locking coarse thread 21 and is arranged coaxially with the axis 12 of the internal spindle 11. The threaded bolt 22 is fixedly connected to a first section 23 of a tailstock sleeve 24 which is axially displaceably but nonrotatable mounted in the tool spindle 2. The tailstock sleeve 24 extends coaxially with the axis of rotation 7 of the tool spindle 2. The tailstock sleeve 24 has a second section 25 which is part of an actuating drive 26, illustrated in FIG. 2, and is connected to the first section 23 via an axial bearing 27 in a rotatable but axially immovable manner in relation thereto.

The tailstock sleeve 24 constitutes coupling means via which the actuating drive 26 is connected to the advancing device comprised of internal spindle 11 and screw drive 18.

The first section 23 of the tailstock sleeve 24 is guided in an opening 28 which is concentric with the axis of rotation 7. For rotationally fixed mounting of the first section 23, the opening 28, like the first section 23, has a polygonal profile 29 in cross section as shown in FIG. 3. The polygonal profile 29 is four cornered with slightly outwardly curved sides 31.

The threaded bolt 22 protrudes with its active end 32 remote from the tailstock sleeve 24 through the threaded nut 19 into a bore 33 which is arranged concentrically in the internal spindle 11 and provides space for displacement of the threaded bolt 22. In the direction of the head 13 of the internal spindle 11, the concentric bore 33 is widened and accommodates an actuating mechanism 34 which is connected via a connecting bolt 35 to the tool receiving means 14. The actuating mechanism 34 comprises a pull rod 36 concentric with the axis 12. The pull rod 36 has a thin shank 37 and a thicker cylindrical flange 38 which faces the active end 32 of the threaded bolt 22 and serves to guide the pull rod 36 in the widened section 39 of the concentric bore 33. The widened section 39 is concentric with the axis 12.

Seated on the shank 37 is a set of Belleville washers 41 which is supported at one end on the flange 38 and at the other end on an abutment in the form of a disc 42 which is fixed with the aid of a spacer bushing 42 in the region of the widened section 39 facing the tool receiving means 14. The spacer bushing 43, for its part, is supported on a part, not illustrated in further detail, of the tool receiving means 14 which protrudes 35 is screwed into the end 44 of the shank 37 which extends through the disc 42 in the direction of the tool receiving means 14 and is guided by the disc 42. The tensional force of the Belleville washer 41 serves, on the one hand, to keep the disc 42 in abutment with the spacer bushing 42, and, on the other hand, to pretension the pull rod 36 towards the right in FIG. 1.

A thrust member 46 is mounted in the flange 38 via an axial bearing 45 in the form of a thrust bearing. The active end 32 of the threaded bolt 22 is engageable with the thrust member 46, with the axial displacement of the threaded bolt 22 required therefor being brought about by the tailstock sleeve 24 driven by the actuating drive 26 in a manner described in further detail hereinbelow.

FIG. 1 shows in an illustration, which is not true to scale the axial adjustment range 47 of the threaded bolt 22 serving to advance the tool 15. The adjustment range 47 is delimited by the end positions of the active end 32 of the threaded bolt 22 indicated at 48 and 49. The coarse thread 21 and the adjustment range 47 are adapted to each other in such a way that the adjustment range 47 corresponds to a 180 degree rotation of the internal spindle 11 with respect to the tool spindle 2.

The end position 49 is separated by a safety range 51 from a position 52 of the active end 32 in which the active end 32 engages the thrust member 46. Adjoining the safety range 51 is a release stroke 54, explained in further detail hereinbelow, which is delimited by a third end position 53 and in which the threaded bolt 22 displaces with its active end 32 the pull rod 37 and hence the connecting bolt 35 in the direction of the tool receiving means 14.

Such tool receiving means 14, illustrated in simplified form in FIG. 4, designed for conventional clamping devices such as, for example, the steep taper shank 55 indicated in the drawing, are known per se, as are their attachment to the head 13 of the internal spindle 11, and, therefore, these need not be described in further detail herein. In the position of the connecting bolt 35 shown in FIG. 4, the threaded bolt 22 is located in the adjustment range 47 or in the safety range 51, i.e., its end 32 is disengaged from the thrust member 46.

In the housing, not illustrated in further detail, of the tool receiving means 14, a bore 56 extends concentrically with the axis 12 of the internal spindle 11 and widens conically in the direction from the internal spindle 11 to the receiving means of the steep taper shank 55. A socket 57 with a collet 58 mounted for longitudinal displacement therein is screwed into the region of the bore 56 pointing towards the internal spindle 11. The mounting of the collet 58 is known per se and is not illustrated in further detail in FIG. 4.

The collet 58 comprises two radially inwardly pointing shoulders 59 and 60 which are arranged opposite each other in the direction of the axis 12. The shoulder 59 facing the steep taper shank 55 is engageable with a tightening bolt 61 screwed into the steep taper shank 55 and the shoulder 60 with the head 62 of the connecting bolt 35. A toroidal member 63 is located radially on the outside of the collet 58 facing the conical widening of the bore 56. The collet 58 is supported with the toroidal member 63 on an inside wall 64 of the socket 57 when the collet 58 is moved fully to the right in FIG. 4. This situation is illustrated in FIG. 4.

The inside wall 64 of the socket 57 has a set back region 65 of larger diameter located in the end of the socket 57 remote from the connecting bolt 35. When the collet 58 is displaced to the left in FIG. 4, owing to the radially outwardly directed pretension of the collet 58, not described in further detail herein, the toroidal member 63 is located in the set back region 65 which serves to open the collet 58.

Figure 2:
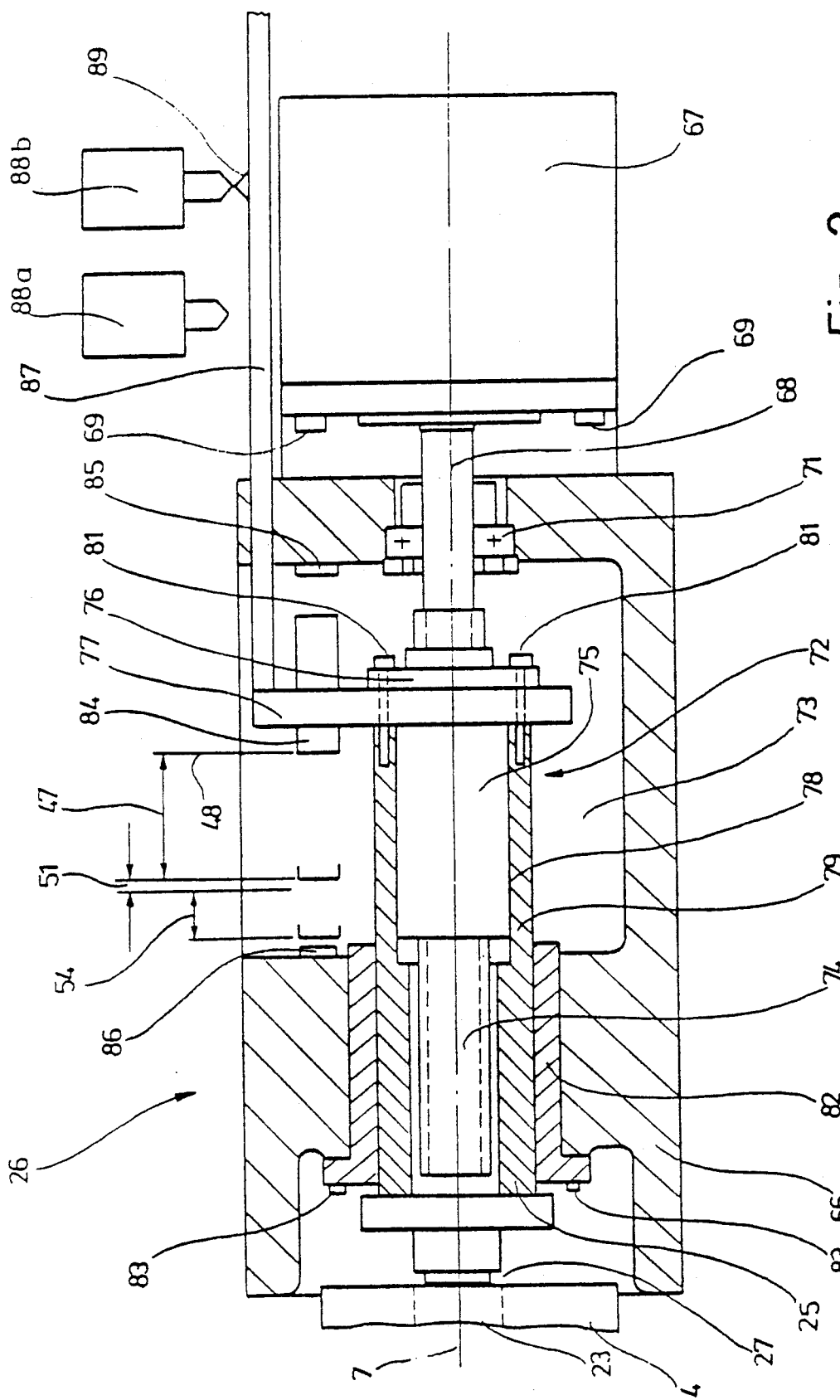
FIG. 2 depicts the actuating drive for the eccentric headstock according the FIG. 1, in axial section.

As mentioned above, the actuating drive 26 is provided for axial displacement of the tailstock sleeve 24 and will be described in further detail hereinbelow with reference to FIG. 2.

The actuating drive 26 is accommodated in a second stationary housing 66 to which a servomotor 67 with an output shaft 68 is firmly screwed by screws 69. The output shaft 68 is mounted in a bearing 71 provided in the housing 66 for rotation about the axis of rotation 7 of the tool spindle 2 and is connected via a second screw drive 72 with the second section 25 of the tailstock sleeve 24. The second screw drive 72 is arranged in a free space 73 in the housing 66 and comprises a ball screw 74 which is rotationally fixedly connected to the output shaft 68 concentrically with the axis of rotation 7. Seated on the ball screw 74 is a ball screw nut 75 which is pretensioned in a play-free manner and has a flange 76 at its end facing the servomotor 67. A carrier 77 is seated on the ball screw nut 75 in abutment with the flange 76. The ball screw nut 75 is positioned in a concentric bore 78 in the second section 25 of the tailstock sleeve 24 in such a way that the carrier 77 abuts to the wall 79 of the concentric bore 78. The ball screw nut 75 and the carrier 77 are firmly screwed to the second section 25 of the tailstock sleeve 24 by screws 81 extending through the flange 76 and the carrier 77.

The second section 25 of the tailstock sleeve 24 extending coaxially with the axis of rotation 7 of the tool spindle 2 is axially displaceably but non-rotatably mounted in a guiding bushing 82 which is screwed to the housing 66 by screws 83. For rotationally fixed mounting, the section 25 and the guiding bushing 82 have the polygonal profile 29 shown in FIG. 3 as internal and external profile, respectively, in cross-section. Screwed into the carrier 77 is a spacer bolt 84 which is aligned parallel to the axis of rotation of the ball screw 74 which coincides with the axis of rotation 7 of the tool spindle 2. A maximum axial range of adjustment for the ball screw nut 75 and hence for the tailstock sleeve 24 is delimited by two stops 85 and 85 which are provided on the housing 66 and with which the spacer bolt 84 can be brought into contact. Within this maximum range of adjustment lie the adjustment range 47, the safety range 51 and the release stroke 54 which are already known from FIG. 1.

Attached to the carrier 77 is an arm 87 which is likewise aligned parallel to the axis of rotation 7 and has an actuating nose 89 for actuating limit switches 88. The attachment of the limit switches 88, only two of which are shown in FIG. 2, is not illustrated in further detail. The limit switches 88 are arranged in relation to each other and to the switching nose 89 such that one limit switch 88 respectively is in engagement with the switching nose 89 when the ball screw nut 75 assumes a marked axial position which is to be indicated to a user. The limit switch 88b, for example, indicates that the ball screw nut 75, and hence the threaded bolt 22 axially immovably connected to it via the tailstock sleeve 24, is located in the rear end positon 48 of the adjustment range 47. The limit switches report the respective end position of the ball screw nut 74 shortly before the mechanical overrun protection becomes effective by the spacer bolt 84 coming into contact with the stops 85, 86, thereby enabling additional electric protection against adjustment errors.

Cooperation of the individual parts of the novel boring device will now be explained with reference to the motions occurring during tool change and subsequent advancing of the newly clamped tool. It will be assumed, as shown in FIGS. 1, 2 and 4, that a steep taper shank 55 with a tool 15 is clamped in the tool receiving means 14 and that the threaded bolt 22 is located in the rear end position 48 of the adjustment range 47 indicated by the limit switch 88b.

By means of the force of the Belleville washers 41, the head 62 of the connecting bolt 35 pretensions the collet 58 to the right in FIG. 4 via the shoulder 60. With its shoulder 59, the collet 58 holds the tightening bolt 61 of the steep taper shank 55 tight and pulls it by the force of the Belleville washers 41 to the right in FIG. 4 so the steep taper shank 55 comes into frictionally connected contact with the wall of the conical opening 56.

The servomotor 67 acts as driving source for the operation described hereinbelow. The controlling is carried out via the choice of the direction of rotation to its output shaft 68 and the angle of rotation through which the output shaft 68 is to be turned. This angle of rotation may assume very small values, but may also be a multiple of 360 degrees. At a standstill, the servomotor 67 exerts a holding moment and thereby prevents unintentional rotation of its output shaft 68 by such forces as occur during cutting of a workpiece and endeavor to alter the advancing of the tool 15. Instead of the servomotor 67, a stepper motor may, of course, also be used.

The ball screw 74 follows the rotary motion of the output shaft 68 and converts it into an axial displacement of the ball screw nut 75 which is held non-rotatably by the second section 25 of the tailstock sleeve 24 which is non-rotatably mounted in the guiding bushing 82. By appropriate choice of the direction of rotation of the output shaft 68, the ball screw nut 75 and with it the arm 87 and the second section 25 of the tailstock sleeve 24 are made to move to the left in FIG. 2. Thereupon, the switching nose 89 also moves to the left and the limit switch 88b indicates that the rear end position 48 of the adjustment range 47 has been passed.

The axial displacement of the second section 25 of the tailstock sleeve 24 is transmitted via the axial bearing 27 onto the first section 24 and the threaded bolt 22. The first screw drive 18 converts this axial motion into a relative rotation of the internal spindle 11 with respect to the tool spindle 2 as, on the one hand, the threaded bolt 22 is held non-rotatably by the first section 23 and, on the other hand, the threaded nut 19 is attached to the axially immovable internal spindle 11. On account of the eccentric mounting of the internal spindle 11 in the tool spindle 2, this rotation results in a change in the radial spacing of the tool 15 from the axis of rotation 7 of the tool spindle 2, and hence in the orbit of the tool cutter, not illustrated in further detail.

If the extent 8 of the eccentricity is designated e and the radial spacing of the tool cutter from the axis 12 of the internal spindle 11 r, the radius R of the orbit (radial spacing of the tool cutter from the axis of rotation 7 of the tool spindle 2) has as maximum value:

$R_{max} = r + e$ and as minimum value: $R_{min} = r - e$. These two extreme positions of the tool cutter are transferrable to one another by relative rotation of the internal spindle with respect to the tool spindle 2 through 180 degrees. As mentioned above, the pitch of the coarse thread 21 and the adjustment range 47 are designed so that the end position 48 corresponds to the radially outer position ($R_{max}$) and the end position 49 to the radially inner position ($R_{min}$) of the tool cutter.

By the axial displacement of the threaded bolt 22 from the end position 48 to the left in FIG. 1, the radial spacing R now becomes smaller until it assumes its smallest value ($R_{min}$) when the threaded bolt is in the end position 49. By further rotation of the output shaft 68, the threaded bolt 22 now enters the safety range 51 and the radial spacing of the tool 15 becomes larger again. To advance the tool 15, the safety range 51 and the release stroke 54, which represent an overstroke, are not used, for the tool positions occurring in these are already covered by the adjustment range 47. The purpose of the safety range 51 is to prevent the active end 32 from unintentionally engaging the thrust member 46 in the event the end position 49 is inadvertently overrun.

By further displacement of the threaded bolt 22, its active end 32 finally enters into engagement with the thrust member 46 at position 52. In the release stroke 54, the threaded bolt 22 now displaces the pull rod 36 against the force of the Belleville washers 41 to the left in FIG. 1. The resulting reaction force is transferred via the disc 42 and the spacer bushing 43 into the tool receiving means 14 and from there into the internal spindle 11 which, consequently, endeavors to move away from the active end 32 to the left in FIG. 1. The reaction force absorbed by the internal spindle 11 is transmitted via the screw ring 20, the roller bearing 16b and a spacer tube onto the roller bearing 16a and from there into the cover 17 which is screwed to the tool spindle 2 so that internal spindle 11 cannot deviate to the left in FIG. 1. A force exerted by the tool 15 via the tool receiving means 14 onto the internal spindle to the right in FIG. 1 is transferred via a shoulder, not designated, of the internal spindle 11 onto the roller bearing 16a and introduced by the latter via the spacer tube 91 and the roller bearing 16b into a shoulder, likewise not designated, of the tool spindle 2 so that internal spindle 11 can also not deviate to the right in FIG. 1.

In the release stroke 54, too, the screw drive 18 rotates the internal spindle 11 with respect to the tool spindle 2 and hence the pull rod 36 with respect to the threaded bolt 2 which with its active end 32 is kept in frictionally connected abutment with the thrust member 46 by the force of the Belleville washers 41. The resulting frictional forces are reduced by the thrust bearing 45 between the pull rod 36 and the thrust member 46.

In the release stroke 54, the connecting bolt 35 moves to the left in FIG. 4, comes with its head 62 into abutment with the tightening bolt 61 and thus displaces the tightening bolt 61 and the steep taper shank 55 and via the shoulder 59 the collet 58 to the left. The toroidal member 63 thereby enters the set back region 65 of the socket 57 and so the collet 58 opens and releases the tightening bolt 61. A tool changer, not illustrated in further detail, can now grip the steep taper shank 55 at its gripper groove 92, pull ito out of the tool receiving means 14 and push in another steep taper shank 55 with a new tool 15.

By reversing the direction of rotation of the servomotor 67, the threaded bolt 22 is now driven back into the end position 49, which is indicated by the limit switch 88a. The pulling force created by the Belleville washers 41 causes the collet 59 to grip the tightening bolt 61 and pull the steep taper shank 15 via it into the tool receiving means 14. The toroidal member 63 thereby slides out of the set back region 65 of the socket 57, the collet 58 closes and holds the tightening bolt 61 tight. The pulling force of the Belleville washers 41 is transmitted via the head 62 of the connecting bolt 35 onto the shoulder 60 and from the latter via the shoulder 59 onto the tightening bolt 61. This pulling force is so great that the steep taper shank 55 is held in a frictionally connected manner in the conical opening of the bore 56.

To advance the tool 15 into a desired radial position, the threaded bolt 22 is now brought via the servomotor 67 and the second screw drive 72 into the corresponding position in the adjustment range 47. This advancing is also possible when the tool spindle 2 is already rotating because the first section 23 and the second section 25 of the tailstock sleeve 24 are connected via the axial bearing 27 in an axially immovable but rotatable manner relative to each other and extend concentrically with the axis of rotation 7 of the tool spindle 2. This two-part design of the tailstock sleeve 24 thus also permits adjustment of the tool 15 while the tool spindle 2 is already rotating.

I claim:
1. A boring device comprising:
a housing;
an elongated spindle, having a front end and rear end;
means for mounting said spindle for rotation in said housing about a longitudinal axis while being axially fixed therein;
an elongate adjustment member having a front end and a rear end rotatably mounted with respect to the spindle in the spindle about an axis eccentric with respect to said spindle axis of rotation but axially fixed thereto;
tool receiving means mounted to the adjustment member at the front end thereof;
said tool receiving means having a bore for receiving and rotationally fixing a tool shank therein to be rotationally drive thereby;
actuating means for relatively rotating said adjustment member with respect to said spindle to cause adjustment of the radial position of said tool receiving means at the front end of said spindle, said actuating means including an elongate actuating member mounted for back and forth axial movement within said spindle, and coupling means causing said relative rotation between said adjustment member and said spindle in response to a corresponding extent of said axial movement of said actuating member, characterized by selectively operable clamping means in said tool receiving means for clamping a tool shank received in said tool receiving bore, said clamping means responsive to a predetermined extent of continued axial movement of said actuating member in one direction to unclamp a tool shank in said tool receiving means bore, whereby both radial adjustment of said tool receiving means and operation of said clamping means are carried out in response to axial movement of said actuating member.

2. The boring device according to claim 1 wherein said radial adjustment of said tool receiving means undergoes a maximum excursion upon 180 degree relative rotation between said spindle and said adjustment member, and wherein said clamping means is responsive to a predetermined extent of axial movement of said actuating member in one direction to cause operation of said clamping means only after a greater extent of axial movement of said actuating member corresponding to 180 degree rotation of said tool receiving means.

3. The boring device according to claim 2 wherein said clamping means is responsive to said axial movement of said actuating element to cause operation of said clamping means only after a predetermined range of movement past the point whereat said 180 degree of relative rotation of said spindle and said adjustment member occurs.

4. The boring device according to claim 1 wherein said actuating means includes a rotary drive motor, a power screw shaft driven by said rotary drive motor, a power nut driven by said power screw shaft to be axially advanced and retracted, and connecting means drivingly connecting said elongated actuating element to said nut to thereby axially advanced and retracted.

5. The boring device according to claim 4 wherein said actuating means further includes a threaded section on said elongate actuating member and an adjustment nut fixed to said adjustment member and in engagement with said threaded section, axial movement of said elongate member thereby causing rotation of said adjustment member to carry out said adjustment.

6. The boring device according to claim 5 wherein said elongate member is slidably fit in said spindle so as to prevent relative rotation therebetween.

7. The boring device according to claim 6 wherein said connecting means includes an unthreaded section of said elongate member fixedly connected to said threaded section but axially fixed with respect thereto, said unthreaded section fixed to said power nut.

8. The boring device according to claim 1 wherein said clamping means includes a pull rod positioned to be abutted by said elongate member after said predetermined extent of axial travel, axial movement of said pull rod adapted to release said tool shank from said bore.

* * * * *